United States Patent
Nishikido et al.

(10) Patent No.: US 9,395,922 B2
(45) Date of Patent: Jul. 19, 2016

(54) INFORMATION SYSTEM AND I/O PROCESSING METHOD

(71) Applicant: Hitachi, Ltd., Tokyo (JP)

(72) Inventors: Naoto Nishikido, Tokyo (JP); Koji Nagata, Tokyo (JP); Takahito Sato, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 14/424,455

(22) PCT Filed: Jan. 10, 2014

(86) PCT No.: PCT/JP2014/050316
§ 371 (c)(1),
(2) Date: Feb. 27, 2015

(87) PCT Pub. No.: WO2015/104833
PCT Pub. Date: Jul. 16, 2015

(65) Prior Publication Data
US 2016/0026397 A1    Jan. 28, 2016

(51) Int. Cl.
*G06F 3/06* (2006.01)
*G06F 11/30* (2006.01)
*G06F 11/20* (2006.01)
(Continued)

(52) U.S. Cl.
CPC ............ *G06F 3/0617* (2013.01); *G06F 3/06* (2013.01); *G06F 3/065* (2013.01); *G06F 3/067* (2013.01); *G06F 3/0619* (2013.01); *G06F 3/0635* (2013.01); *G06F 11/00* (2013.01); *G06F 11/2064* (2013.01); *G06F 11/2069* (2013.01);
(Continued)

(58) Field of Classification Search
None
See application file for complete search history.

(56) References Cited

U.S. PATENT DOCUMENTS 7,827,441 B1    11/2010    Wenzel
8,498,967 B1 *   7/2013    Chatterjee ......... G06F 17/30174
                                                                707/639
(Continued)

FOREIGN PATENT DOCUMENTS

JP    2007-528557 A    10/2007
JP    2009-266120 A    11/2009

OTHER PUBLICATIONS

Davidson et al. "Consistency in a Partitioned Network: A Survey." Jan. 1984. University of Pennsylvania CIS. http://repository.upenn.edu/cis_reports/636.*

(Continued)

*Primary Examiner* — Nathan Sadler
(74) *Attorney, Agent, or Firm* — Mattingly & Malur, PC

(57) ABSTRACT

In an information system including: first and second storage apparatuses executing synchronous copying of data to a counterpart storage device; a first quorum apparatus coupled to the first and the second storage apparatuses; and a second quorum apparatus coupled to the first and the second storage apparatuses, wherein the first and the second storage apparatuses are each configured to perform control to determine whether to execute the I/O request in accordance with an execution feasibility setting, and in health check processing that is repeatedly executed, the first and the second storage apparatuses are each configured to store survival information thereof in the first and the second quorum apparatuses, check whether the survival information of the counterpart storage apparatus is able to be checked from any one of the first and the second quorum apparatuses, and set the execution feasibility setting of the storage apparatus.

11 Claims, 13 Drawing Sheets

| Inter-storage communication | Active quorum | Standby quorum | I/O by storage executing health check processing | |
|---|---|---|---|---|
| O | O | O | Maintain "executable" | 511 |
| O | O | × | Maintain "executable" | 512 |
| O | × | O | Change "standby" to "active" Maintain "executable" | 513 |
| O | × | × | Change to "non-executable" for second storage Maintain "executable" for storage executing processing | 514 |
| × | O | O | Counterpart has already made access? ⇒change to "non-executable" Storage executing processing has made access first?⇒maintain "executable" | 515 |
| × | O | × | Counterpart has already made access? ⇒change to "non-executable" Storage executing processing has made access first?⇒maintain "executable" | 516 |
| × | × | O | Counterpart has already made access? ⇒change to "non-executable" Storage executing processing has made access first?⇒maintain "executable" | 517 |
| × | × | × | Change to "non-executable" | 518 |

(51) Int. Cl.
*G06F 11/00* (2006.01)
*G06F 11/14* (2006.01)

(52) U.S. Cl.
CPC ........ *G06F 11/2094* (2013.01); *G06F 11/3034* (2013.01); *G06F 11/1425* (2013.01)

(56) References Cited

U.S. PATENT DOCUMENTS

| | | | |
|---|---|---|---|
| 9,116,862 B1* | 8/2015 | Rath | G06F 11/2097 |
| 2003/0046602 A1* | 3/2003 | Hino | G06F 11/2033 |
| | | | 714/4.4 |
| 2005/0080895 A1 | 4/2005 | Cook et al. | |
| 2005/0166018 A1* | 7/2005 | Miki | G06F 11/2069 |
| | | | 711/117 |
| 2005/0262382 A1 | 11/2005 | Bain | |
| 2008/0126846 A1* | 5/2008 | Vivian | G06F 11/1482 |
| | | | 714/6.12 |
| 2012/0192006 A1* | 7/2012 | Qi | G06F 11/0757 |
| | | | 714/6.22 |
| 2012/0246511 A1 | 9/2012 | Sato | |
| 2013/0132767 A1 | 5/2013 | Ninose | |
| 2014/0337664 A1* | 11/2014 | Gokhale | G06F 11/1464 |
| | | | 714/6.3 |

OTHER PUBLICATIONS

Siemens. "Clusterfree." Unknown date. http://www.siemens.com/download?DLA02_6323.*
Written Opinion of the International Searching Authority for International Application No. PCT/JP2014/050316 dated Feb. 10, 2014.

* cited by examiner

Fig. 4

Storage held table 300

| Number | Item | Value |
|---|---|---|
| 1 | I/O by this storage | Executable |
| 2 | Quorum attribute of this storage | Active |
| 3 | Quorum update time point of this storage | 20131201090735 |
| 4 | Standby flag of this storage | Off |
| 5 | I/O by counterpart storage | Executable |
| 6 | Quorum attribute of counterpart storage | Active |
| 7 | Quorum update time point of counterpart storage | 20131201090730 |
| 8 | Standby flag of counterpart storage | Off |

Quorum held table 400

| Num-ber | Item | Value |
|---|---|---|
| 1 | I/O by first storage | Executable |
| 2 | Quorum attribute of first storage | Active |
| 3 | Quorum update time point of first storage | 20131201090735 |
| 4 | Standby flag of first storage | Off |
| 5 | I/O by second storage | Executable |
| 6 | Quorum attribute of second storage | Active |
| 7 | Quorum update time point of second storage | 20131201090730 |
| 8 | Standby flag of second storage | Off |

| Inter-storage communication | Active quorum | Standby quorum | I/O by storage executing health check processing |
|---|---|---|---|
| ○ | ○ | ○ | Maintain "executable" |
| ○ | ○ | × | Maintain "executable" |
| ○ | × | ○ | Change "standby" to "active" Maintain "executable" |
| ○ | × | × | Change to "non-executable" for second storage Maintain "executable" for storage executing processing |
| × | ○ | ○ | Counterpart has already made access? ⇒change to "non-executable" Storage executing processing has made access first?⇒maintain "executable" |
| × | ○ | × | Counterpart has already made access? ⇒change to "non-executable" Storage executing processing has made access first?⇒maintain "executable" |
| × | × | ○ | Counterpart has already made access? ⇒change to "non-executable" Storage executing processing has made access first?⇒maintain "executable" |
| × | × | × | Change to "non-executable" |

INFORMATION SYSTEM AND I/O PROCESSING METHOD

TECHNICAL FIELD

The present invention relates to a technique for an information system and an I/O (Input/Output) processing method.

BACKGROUND ART

A known information system includes: two storage apparatuses forming a copy pair through a predetermined communication path; one quorum apparatus for failure detection that can be commonly accessed by the two storage apparatuses; and a host computer that is coupled to the two storage apparatuses through an alternate path (PTL 1).

CITATION LIST

Patent Literature

[PTL 1]
Japanese Patent Application Publication No. 2009-266120

SUMMARY OF INVENTION

Technical Problem

When a failure occurs in the communication path between the storage apparatus in a state without a quorum apparatus, one of the storage apparatuses needs to be unable to be accessed by the host computer. Otherwise, each of the storage apparatuses can be accessed by the host computer and might provide improper data to the host computer. Thus, when a failure occurs in the quorum apparatus in the information system described in PTL1, one of the storage apparatuses is set to be I/O request non-executable in preparation for the failure in the communication path between the storage apparatuses even in a state with no failure occurring in the two storage apparatuses or in the communication path between the storage apparatuses. Thus, the information system cannot maintain a duplex configuration when a failure occurs in the quorum apparatus.

In view of the above, an object of the present invention is to provide an information system and an I/O processing method that can facilitate an attempt to maintain the duplex configuration.

Solution to Problem

An information system according to an embodiment of the present invention includes first and second storage apparatuses and first and second quorum apparatuses. The first and the second storage apparatuses each coupled to a host computer, configured to transmit an I/O request as a write request or a read request, and configured to synchronously copy, upon receiving the write request, data corresponding to the received write request to a counterpart storage apparatus. The first quorum apparatus is coupled to the first and the second storage apparatuses, the second quorum apparatus is coupled to the first and the second storage apparatuses. The first and the second storage apparatuses are each configured to perform control to determine whether to execute the I/O request in accordance with an execution feasibility setting as a setting to determine whether to execute the I/O request. In health check processing that is repeatedly executed, the first and the second storage apparatuses are each configured to store survival information indicating whether the storage apparatus is surviving in the first and the second quorum apparatuses, check whether the survival information of the counterpart storage apparatus is able to be checked from any one of the first and the second quorum apparatuses, and set the execution feasibility setting of the storage apparatus based on at least one of whether the survival information is able to be stored in at least one of the first and the second quorum apparatuses and whether the survival information of the counterpart storage apparatus is able to be checked from any one of the first and the second quorum apparatuses.

Advantageous Effects of Invention

The present invention can facilitate an attempt to maintain a duplex configuration of an information system, thereby improving availability of the information system.

BRIEF DESCRIPTION OF DRAWINGS

FIG. 4 shows a configuration example of a storage held table.
FIG. 5 shows a configuration example of a quorum held table.
FIG. 12 shows examples of how the feasibility of the storage apparatus to execute the I/O request changes in the health check processing.

DESCRIPTION OF EMBODIMENTS

Figure 1:
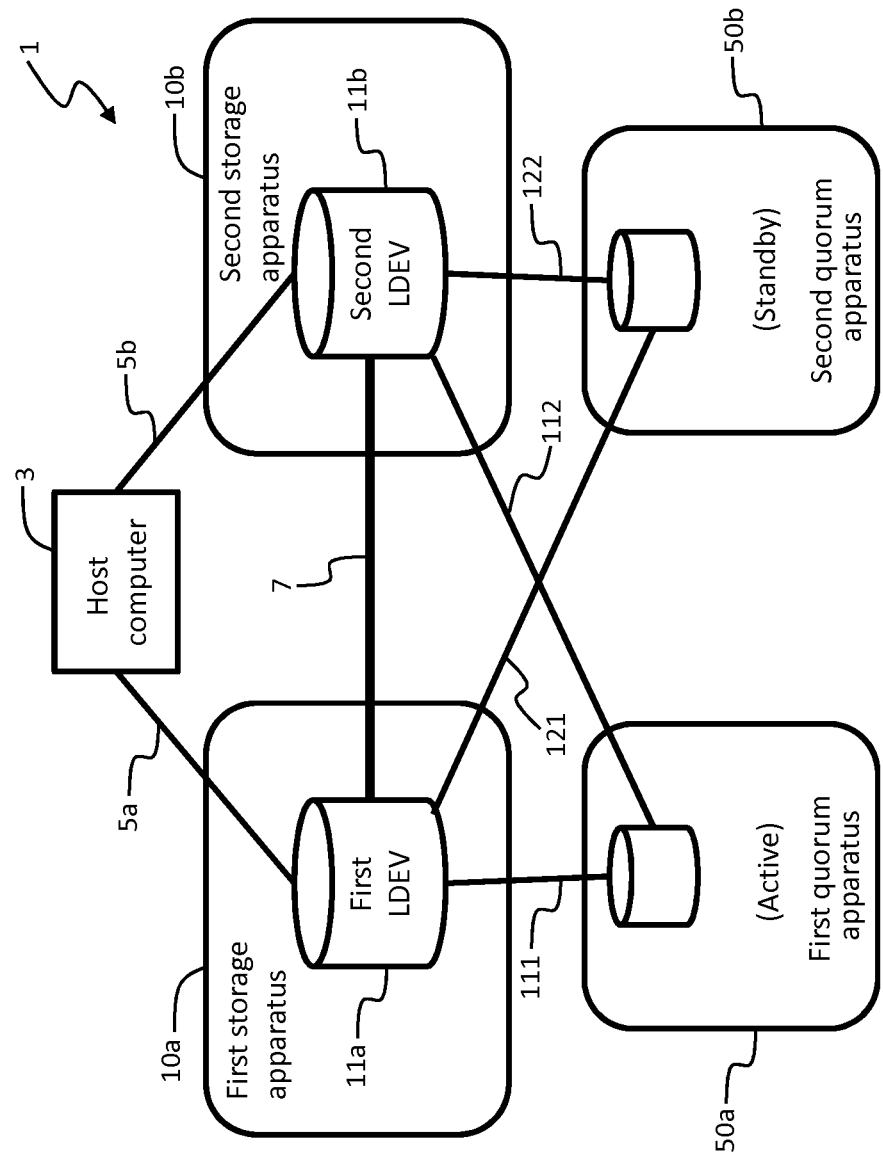
FIG. 1 shows an overall configuration of an information system according to an embodiment.

An embodiment is described below.
In the present embodiment, a "quorum apparatus" is a storage apparatus that is shared by a plurality of cluster nodes and stores information updated by each of the plurality of cluster nodes. A storage device of the quorum apparatus may be a disk device such as an HDD (Hard Disk Drive) or a device such as an SSD (Solid State Drive). The "cluster node" is a node as a component of a cluster, and is a storage apparatus that provides an LDEV (Logical Device) accessed by a host computer in the present embodiment. The "LDEV" is a logical storage device that may be referred to as a logical volume. The LDEV may be a tangible LDEV based on at least one physical storage device (for example, a RAID (Redundant Arrays of Inexpensive (or Independent) Disks) group) or may be a virtual LDEV based on a storage virtualization technique or a capacity-enhancing technique (for example, Thin Provisioning).

Various types of information may be described below as "xxx table" but may also be in a data structure other than tables. The "xxx table" may be referred to as "xxx information" to show no independence to the data structure. An "I/O request" described below indicates a write request or a read request.

An outline of an entire configuration of an in information system according to an embodiment is described with reference to FIG. 1.

An information system 1 includes a host computer 3, a first storage apparatus 10a, a second storage apparatus 10b, a first quorum apparatus 50a, and a second quorum apparatus 50b.

The first storage apparatus 10a and the second storage apparatus 10b form a cluster and are coupled to each other through an inter storage communication path 7. The first storage apparatus 10a and the first quorum apparatus 50a are coupled to each other through a communication path 111. The first storage apparatus 10a and the second quorum apparatus 50b are coupled to each other through a communication path 121. The second storage apparatus 10b and the first quorum apparatus 50a are coupled to each other through a communication path 112. The second storage apparatus 10b and the second quorum apparatus 50b are coupled to each other through a communication path 122.

The host computer 3 is coupled to the first storage apparatus 10a through a communication path 5a and is coupled to the second storage apparatus 10b through a communication path 5b. The communication paths 5a, 5b, 7, 111, 121, 112, and 122 may be communication paths directly coupled through physical cables, or may be logical communication paths formed on a SAN (Storage Area Network), a LAN (Local Area Network), and/or the Internet. Switches and routers maybe coupled to an intermediate portion of the communication paths 5a, 5b, 7, 111, 121, 122, and 121.

The first storage apparatus 10a and the second storage apparatus 10b respectively include a first LDEV 11a and a second LDEV 11b. The storage apparatuses 10a and 10b write and read data respectively to and from the LDEVs 11a and 11b thereof, in response to an I/O request transmitted from the host computer 3.

The first LDEV 11a of the first storage apparatus 10a and the second LDEV 11b of the second storage apparatus 10b form a synchronous remote copy pair so that data stored in the first LDEV 11a is copied to the second LDEV 11b through the inter storage communication path 7. Thus, in a normal state, data is synchronized between the first LDEV 11a and the second LDEV 11b.

Each of the storage apparatuses 10a and 10b writes survival information, indicating that the storage apparatus is surviving, to a quorum apparatus, repeatedly (at a predetermined interval). Each of the storage apparatuses 10a and 10b checks whether the counterpart storage apparatus is surviving by referring to the quorum apparatus, when the synchronous copying to the counterpart storage apparatus through the inter storage communication path 7 cannot be executed. In the information system 1, when the counterpart storage apparatus is surviving, one of the storage apparatuses (for example, the first storage apparatus 10a) is set to be capable of executing an I/O request, and the other one of the storage apparatuses (for example, the second storage apparatus 10b) is set to be not capable of executing the I/O request. In the information system 1, when the counterpart storage apparatus is not surviving, the surviving storage apparatus is set to be capable of executing the I/O request. Here, the surviving storage apparatus is a storage apparatus that is normally operating and thus can execute the I/O request from the host computer 3.

Now, a comparative example involving a single quorum apparatus is described. Here, when a failure occurs in the quorum apparatus, one storage apparatus is set to be capable of executing the I/O request and the other storage apparatus is set to be not capable of executing the I/O request, and thus a duplex structure of the storage apparatuses is cancelled. This is because when the failure occurs in such a situation, inter storage communications can no longer be executed, and each storage apparatus cannot determine whether the counterpart storage apparatus is surviving. Thus, which of the storage apparatuses should be set to be capable of executing the I/O request cannot be determined. For example, when the I/O request is executable by both of the storage apparatuses in the situation described above, different data pieces might be written to the storage apparatuses, to cause data mismatch between the volumes forming the copy pair.

To address this, the information system 1 according to the present embodiment includes two quorum apparatuses 50a and 50b as shown in FIG. 1. At least one of the first and the second quorum apparatuses may update information in the first quorum apparatus 50a and information in the second quorum apparatus 50b at the same or different intervals. The information system 1 includes the two quorum apparatuses 50a and 50b, and thus the duplex configuration formed of the first storage apparatus 10a and the second storage apparatus 10b can be maintained even when a failure occurs in one of the quorum apparatuses.

The first quorum apparatus 50a and the second quorum apparatus 50b have different attributes. For example, the first quorum apparatus 50a has an active attribute as one type of a first attribute and the second quorum apparatus 50b has a standby attribute as one type of a second attribute. Thus, when a predetermined failure occurs, each of the first storage apparatus 10a and the second storage apparatus 10b can determine whether the storage apparatus should be set to be capable or not capable of executing the I/O request from the host computer 3, based on the attribute of the quorum apparatus that can be accessed. Thus, information system 1 can be prevented from providing improper data to the host computer 3 when the predetermined failure occurs. For example, at least one of the first and the second quorum apparatuses may be set to have the update interval of the quorum apparatus with the active attribute shorter than the update interval of the quorum apparatus with the standby attribute.

Figure 2:
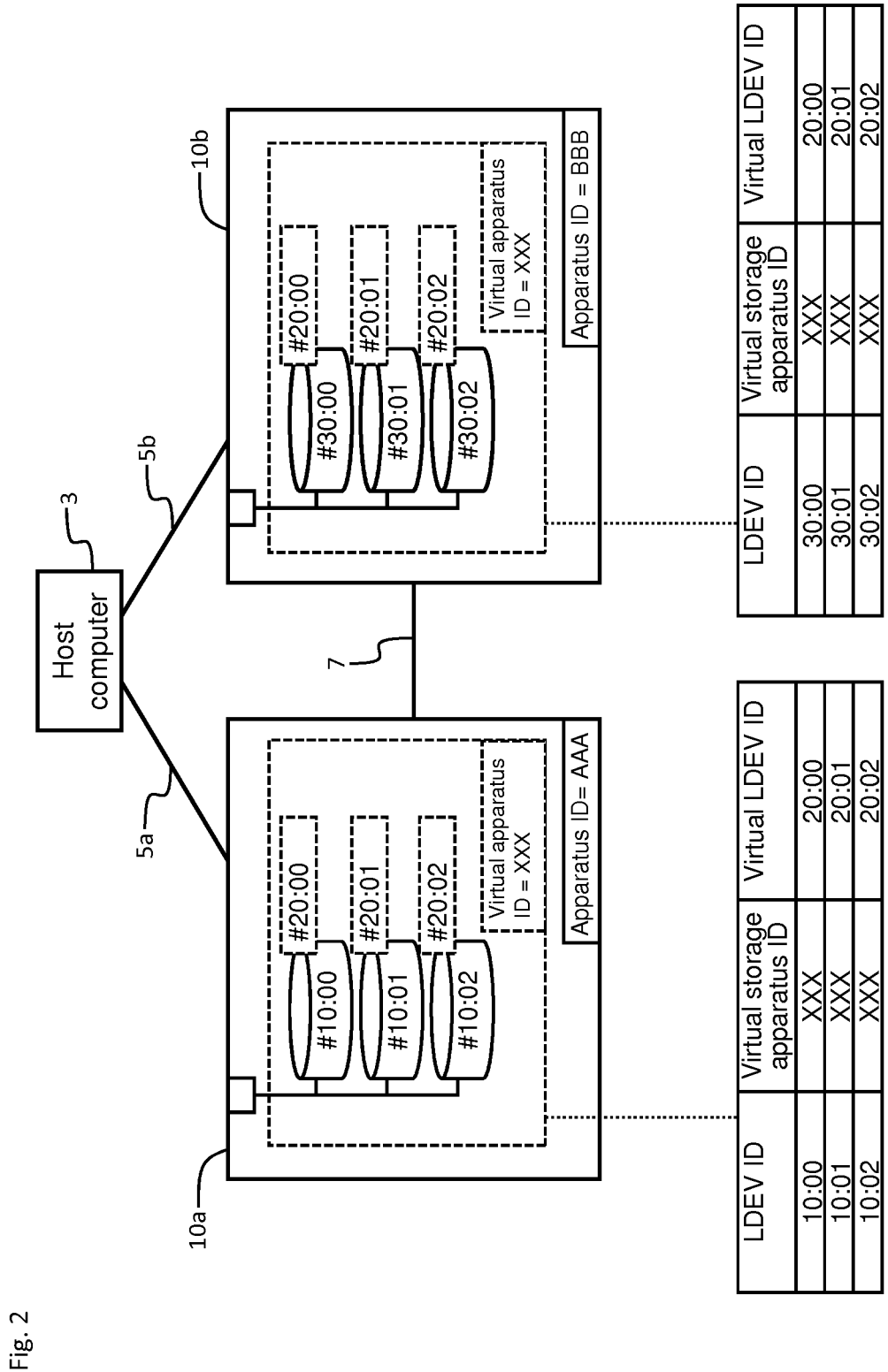
FIG. 2 shows LDEVs provided to a host computer.

Next, LDEVs provided to the host computer 3 will be described with reference to FIG. 2.

The two storage apparatuses 10a and 10b are associated with the same virtual storage ID to be recognized as the same storage apparatus by the host computer 3. The host computer 3 recognizes the virtual storage ID.

LDEVs 11a and 11b of the respective storage apparatuses 10a and 10b are provided with LDEV IDs uniquely identified in the storage apparatuses. The LDEVs forming one copy pair is provided with the same virtual LDEV ID. Thus, the LDEVs forming the copy pair is provided with the LDEV and virtual LDEV IDs. The host computer 3 recognizes the virtual LDEV ID.

By thus setting the virtual storage ID and the virtual LDEV ID, the host computer 3 can recognize the different LDEVs of the different storage apparatus as the same LDEV of the same storage apparatus. The host computer 3 issues an I/O request while assuming that two alternate paths (communication paths 5a and 5b) are set to one LDEV.

Synchronous remote copying is performed on a side of the storage apparatuses so that write data received by one of the storage apparatuses is transferred to the other storage apparatus to duplicate the write data. The two storage apparatuses need to maintain the duplex state so that data mismatch does not occur between the two LDEVs recognized as one LDEV.

The host computer 3 in the present embodiment preferentially transmits the I/O request to the first storage apparatus 10a. When the I/O request ends in an error, the host computer 3 transmits the I/O request to the second storage apparatus 10b. The host computer 3 determines that the I/O request has ended in an error, upon receiving an error reply for the I/O request or when a reply for the I/O request is timed out. The LDEVs of the first storage apparatus 10a and the second storage apparatus 10b forming the synchronous copy pair stores the same data. Thus, even when the I/O request to the first storage apparatus 10a ends in an error, the host computer 3 can continue the processing by retransmitting the I/O request to the second storage apparatus 10b.

As described above, the two storage apparatuses 10a and 10b need to prevent the data mismatch so that the host computer 3 recognizes two different LDEVs as the same LDEV. Thus, when the failure occurs in the inter storage communication path 7 while the two storage apparatuses are surviving, anyone of the storage apparatuses needs to be set to be capable of executing the I/O request, and the other one of the storage apparatuses needs to be set to be not capable of executing the I/O request. Otherwise, improper data might be provided to the host computer 3 so that the host computer 3 that has written data to the LDEV of the one storage apparatus might then refer to the other storage apparatus to find that the write data is not stored. However, when one of the storage apparatus is not surviving, the other storage apparatus needs to be set to be capable of executing the I/O request.

Figure 3:
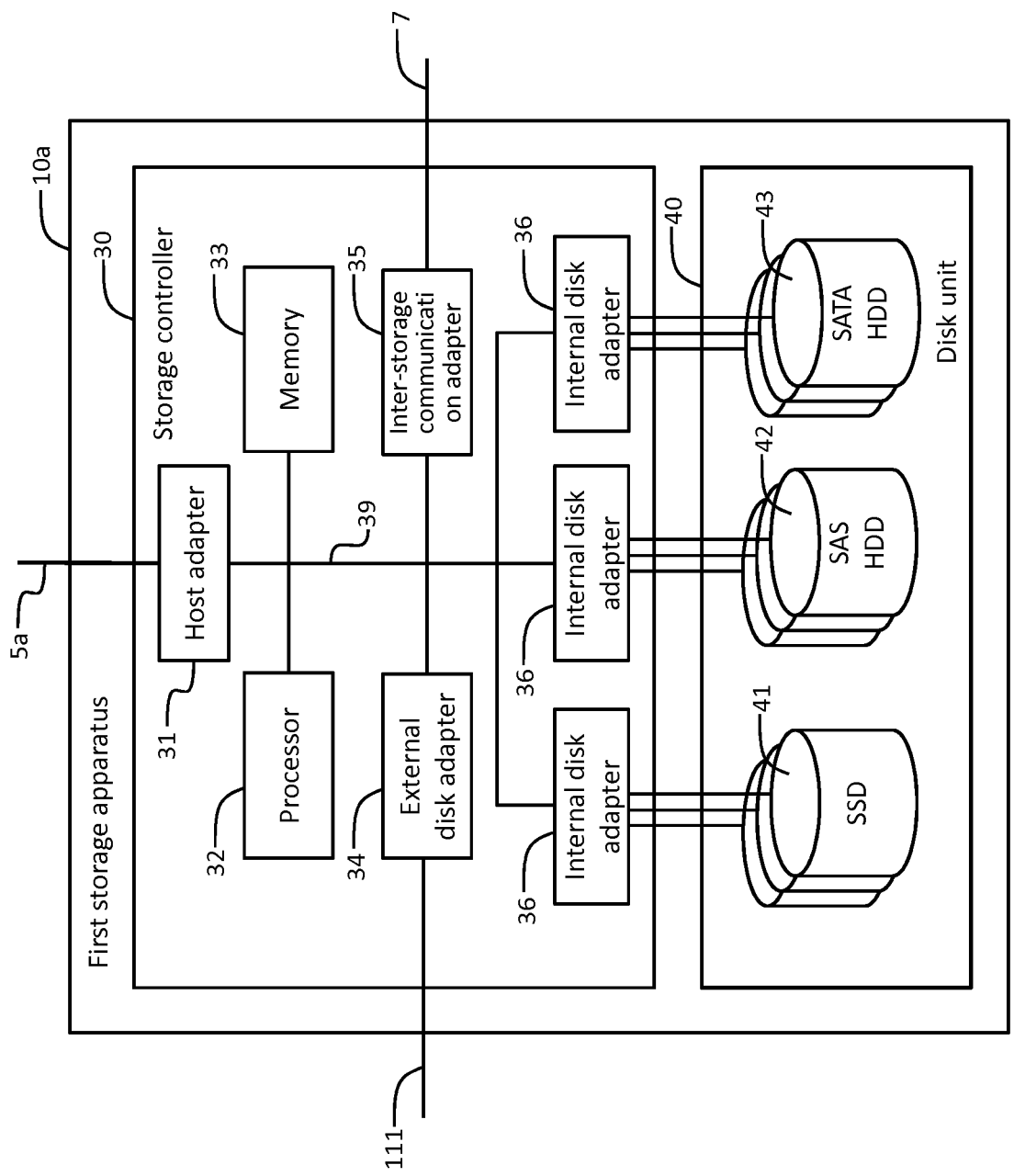
FIG. 3 shows an example of an internal configuration of a storage apparatus.

An example of an internal configuration of the storage is described with reference to FIG. 3. The first storage apparatus 10a and the second storage apparatus 10b have the same or similar configuration, and thus the first storage apparatus 10a is described herein.

The first storage apparatus 10a includes a storage controller 30 and a disk unit 40.

The disk unit 40 includes a plurality of storage devices 41 to 43. The disk unit 40 may include a plurality of storage devices of the same type or different types. The storage devices may be a SSD, a SAS (Serial Attached SCSI)-HDD, and/or SATA (Serial ATA)-HDD.

The storage controller 30 controls the plurality of storage devices 41 to 43 of the disk unit 40. The storage controller 30 includes a host adapter 31, a processor 32, a memory 33, an external disk adapter 34, an inter storage communication adapter 35, and an internal disk adapter 36 that are coupled to each other through a bus 39 in a mutually communicable manner.

The internal disk adapter 36 is a device for coupling the storage devices 41 to 43 to the storage controller 30. The internal disk adapter 36 maybe a SATA adapter, a SCSI adapter, a PCIe (PCI Express (registered trademark)) adapter, a Fibre Channel adapter, an Ethernet (registered trademark) adapter, or the like.

The host adapter 31 is a device for coupling the storage controller 30 to the communication path 5a related to the host computer 3. The host adapter 31 may be a SATA adapter, a SCSI adapter, a PCIe adapter, a Fibre Channel adapter, an Ethernet adapter, or the like.

The external disk adapter 34 is a device for coupling the storage controller 30 to the communication paths 111 and 121 related to the quorum apparatuses 50a and 50b. The external disk adapter 34 may be a SATA adapter, a SCSI adapter, a PCIe adapter, a Fibre Channel adapter, an Ethernet adapter, or the like.

The inter storage communication adapter 35 is a device for coupling the storage controller 30 to the inter storage communication path 7 related to the second storage apparatus 10b. The inter storage communication adapter 35 may be a SATA adapter, a SCSI adapter, a PCIe adapter, a Fibre Channel adapter, an Ethernet adapter, or the like.

The memory 33 stores a computer program to be executed by the processor 32, data, and the like. The memory 33 temporarily stores (caches) data transmitted and received through the bus 39. The memory 33 at least includes amain storage memory. The main storage memory is typically a volatile memory but may also be a non-volatile memory. The memory 33 may be formed of a DRAM (Dynamic Random Access Memory), a MRAM (Magnetoresistive Random Access Memory), a FeRAM (Ferroelectric Random Access Memory), a SSD, or the like.

The processor 32 executes a predetermined computer program to implement various functions of the storage apparatus. The processor 32 may include an ASIC (Application Specific Integrated Circuit) that can execute predetermined processing.

The first storage apparatus 10a and the second storage apparatus 10b each hold a storage held table 300 (described later). The first quorum apparatus 50a and the second quorum apparatus 50b each hold a quorum held table 400 (described later). The storage held table 300 and the quorum held table 400 each manages information indicating whether a storage apparatus is surviving, whether the storage apparatus can execute the I/O request, and the like.

In the present embodiment, the storage held table held by the first storage apparatus 10a may be referred to as a first storage held table and the storage held table held by the second storage apparatus 10b may be referred to as a second storage held table. In the present embodiment, the quorum apparatus with the active attribute may be referred to as an "active quorum" and the quorum apparatus with the standby attribute may be referred to as a "standby quorum". In the present embodiment, the quorum held table held by the active quorum may be referred to as an active quorum held table and the quorum held table held by the standby quorum may be referred to as a standby quorum held table.

The storage held table 300 is described below with reference to FIG. 4.

The storage held table 300 includes, as items, feasibility of I/O by this storage 311, quorum attribute of this storage 312, quorum update time point of this storage 313, standby flag of this storage 314, feasibility of I/O by counterpart storage 315, quorum attribute of counterpart storage 316, quorum update time point of counterpart storage 317, standby flag of counterpart storage 318, and values corresponding to the items 311 to 318.

I/O by this storage 311 has a value indicating whether the storage apparatus holding the storage held table 300 is set to be capable or not capable of executing the I/O request. For example, the value is set to "executable" when the storage apparatus is capable of executing the I/O request, and set to "none-executable" when the storage apparatus is not capable of executing the I/O request. I/O by counterpart storage 315 has a value indicating whether the counterpart storage apparatus is set to be capable of or not capable of executing the I/O request.

Quorum attribute of this storage 312 has a value indicating whether the storage apparatus holding the storage held table 300 is capable of accessing any one of the active quorum and the standby quorum. For example, the value is set to "active" when the storage apparatus is capable of accessing the active quorum, set to "standby" when the storage apparatus is not capable of accessing the active quorum but is capable of accessing the standby quorum, and is set to "none" when the storage apparatus is capable of accessing neither of the quorum apparatuses. Quorum attribute of counterpart storage 316 has a value indicating whether the counterpart storage apparatus is capable of accessing any one of the active quorum and the standby quorum.

Quorum update time point of this storage 313 has a value indicating a latest time point at which the storage apparatus holding the storage held table 300 has accessed the quorum apparatus indicated by the value of quorum attribute of this storage 312. The value is referred to as "access time point". For example, the value is "20131201090735" when the storage apparatus has accessed the quorum apparatus having the active attribute at "Dec. 1, 2013 7 minutes and 35 seconds past 9". Quorum update time point of counterpart storage 317 has a value indicating a latest time point at which the counterpart storage apparatus has accessed the quorum apparatus indicated by the value of quorum attribute of counterpart storage 316.

Standby flag of this storage 314 has a value for checking whether the storage apparatus holding the storage held table 300 is checking the standby quorum for the second time. The value is set to "OFF" in the initial state and then is turned "ON" after the first checking, whereby the storage apparatus can recognize that the second checking is performed when the value is "ON". The value is used in the health check processing (S131 in FIG. 8) and in the I/O request execution processing (S241 in FIG. 9). Other counterpart standby flags have a value for checking whether the counterpart storage apparatus is checking the standby quorum 50b for the second time.

The quorum held table 400 is described below with reference to FIG. 5.

The quorum held table 400 includes, as items, I/O by first storage 411, quorum attribute of first storage 412, quorum update time point of first storage 413, standby flag of first storage 414, I/O by second storage 415, quorum attribute of second storage 416, quorum update time point of second storage 417, standby flag of second storage 418, and values corresponding to the items 411 to 418.

I/O by first storage 411 has a value indicating whether the first storage apparatus 10a is set to be capable or not capable of executing the I/O request. For example, the value is set to "executable" when the first storage apparatus 10a is capable of executing the I/O request, and is set to "non-executable" when the first storage apparatus 10a is not capable of executing the I/O request. I/O by second storage 415 has a value indicating whether the second storage apparatus 10b is set to be capable or not capable of executing the I/O request.

The value of I/O by first storage 411 is linked with the value of I/O by first storage 311 in the storage held table 300 held by the first storage apparatus 10a and the value of the I/O by counterpart storage 315 in the storage held table 300 held by the second storage apparatus 10b. The value of I/O by second storage 415 is linked with the value of the I/O by counterpart storage 315 in the storage held table 300 of the first storage apparatus 10a and the value of I/O by first storage 311 in the storage held table 300 of the second storage apparatus 10b.

Quorum attribute of first storage 412 has a value indicating whether the first storage apparatus 10a is capable of accessing any one of the active attribute and the standby attribute. For example, the value is set to "active" when the first storage apparatus 10a is capable of accessing the active quorum, set to "standby" when the first storage apparatus 10a is not capable of accessing the active quorum but is capable of accessing the standby quorum, and is set to "none" when the first storage apparatus 10a is capable of accessing neither of the quorum apparatuses. Quorum attribute of second storage 416 has a value indicating whether the second storage apparatus 10b is capable of accessing any one of the active attribute and the standby attribute.

The value of quorum attribute of first storage 412 is linked with the value of quorum attribute of this storage 312 in the storage held table 300 held by the first storage apparatus 10a and the value of quorum attribute of counterpart storage 316 in the storage held table 300 held by the second storage apparatus 10b. Quorum attribute of second storage 416 is linked with the value of quorum attribute of counterpart storage 316 in the storage held table 300 held by the first storage apparatus 10a and the value of quorum attribute of this storage 312 in the storage held table 300 held by the second storage apparatus 10b.

Quorum update time point of first storage 413 has a value indicating a latest time point (access time point) at which the first storage apparatus 10a has accessed the quorum apparatus holding the quorum held table 400. The first storage apparatus 10a in the surviving state updates the value (access time point) of the quorum update time point of first storage 413 repeatedly (at a predetermined interval). Thus, when the value of the quorum update time point of first storage 413 is not updated for a period exceeding the predetermined interval, the second storage apparatus 10b can determine that the first storage apparatus 10a might not be surviving or the first storage apparatus 10a might not be capable of accessing the quorum apparatus. Quorum update time point of second storage 417 has a value indicating a latest time point at which the second storage apparatus 10b has accessed the quorum apparatus.

The value of quorum update time point of first storage 413 is linked with the value of quorum update time point of this storage 313 in the storage held table 300 held by the first storage apparatus 10a and the value of quorum update time point of counterpart storage 317 in the storage held table 300 held by the second storage apparatus 10b. The value of the quorum update time point of second storage 417 is linked with the value of the quorum update time point of counterpart storage 317 in the storage held table 300 held by the first storage apparatus 10a and the value of the quorum update time point of this storage 313 in the storage held table 300 held by the second storage apparatus 10b.

Standby flag of first storage 414 has a value for checking whether the first storage apparatus 10a is checking the quorum apparatus with the standby attribute for the second time. The value is "OFF" in the initial state and is turned "ON" after the first checking, whereby the first storage apparatus can recognize that the second checking is performed when the value is "ON". The value is used in the health check processing (S131 in FIG. 8) and in the I/O request execution processing (S241 in FIG. 9). Standby flag of second storage 418 has a value for checking whether the second storage apparatus 10b is checking the quorum apparatus with the standby attribute for the second time.

The value of standby flag of first storage 144 is linked with the value of standby flag of this storage 314 in the storage held table 300 held by first storage apparatus 10a and with the value of standby flag of counterpart storage 318 in the storage held table 300 held by the second storage apparatus 10b. The value of standby flag of second storage 418 is linked with the value of standby flag of counterpart storage 318 in the storage held table 300 held by the first storage apparatus 10a and the value of standby flag of this storage 314 in the storage held table 300 held by the second storage apparatus 10b.

Figure 6:
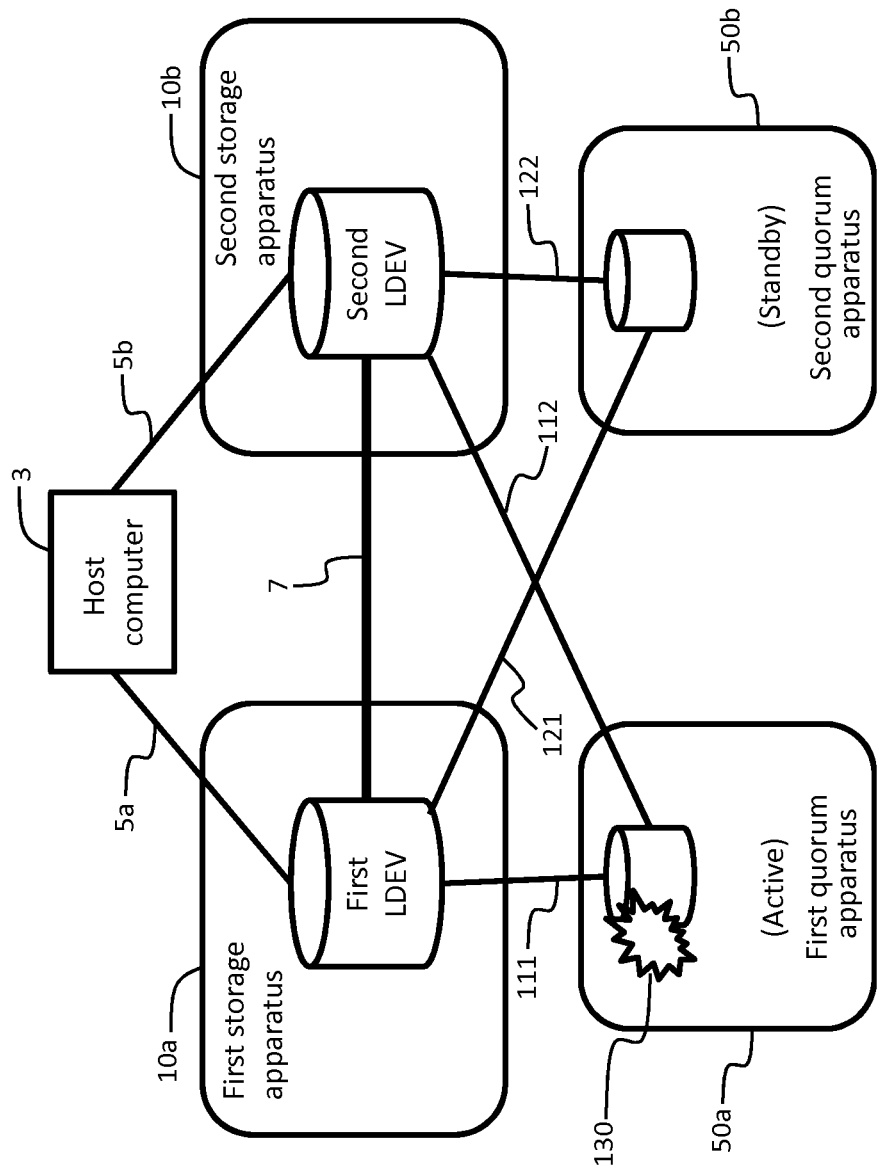
FIG. 6 shows an example of operations performed in the information system in a case where a failure has occurred in a first quorum apparatus with an active attribute.

Next, an example of operations performed in the information system 1, when a failure 130 occurs in the first quorum apparatus 50a with the active attribute, will be described with reference to FIG. 6.

In the health check processing executed at a predetermined interval, the first storage apparatus 10a updates the value of quorum update time point of first storage 413 of the first and the second quorum apparatuses 50a and 50b with a current access time point. Similarly, in the health check processing executed at a predetermined interval, the second storage apparatus 10b updates the value of quorum update time point of second storage 417 of the first and the second quorum apparatuses 50a and 50b with the current access time point. The first storage apparatus 10a can determine that the second storage apparatus 10b is surviving when the value of quorum update time point of second storage 417, in the first quorum apparatus 50a or the second quorum apparatus 50b, is updated at the predetermined period. The first storage apparatus 10a can determine that the second storage apparatus 10b might not be surviving when the value of quorum update time point of second storage 417, in the first quorum apparatus 50a or the second quorum apparatus 50b, has not been updated for a period longer than the predetermined interval. The same applies to the second storage apparatus 10b. Thus, the value (that is, the access time point) of quorum update time point of first storage 413 and quorum update time point of second storage 417 in the quorum held table 400 may be information other than the access time point such as a count value for example, as long as the information is survival information that is used for determining whether the first storage apparatus 10a and the second storage apparatus 10b are surviving and can be updated to inform that the storages are surviving.

In the present embodiment, "case where the access time point of the counterpart storage apparatus is updated at the predetermined interval" may be a case where the difference between the time point at which the access time point of the counterpart storage apparatus is checked and the checked access time point of the counterpart storage apparatus is shorter than a threshold (for example, the predetermined interval or the predetermined interval+a predetermined time). Thus, "case where the access time point of the counterpart storage apparatus is not updated for a period longer than the predetermined period" may be a case where the difference between the time point at which the access time point of the counterpart storage apparatus is checked and the checked access time point of the counterpart storage apparatus is equal to or longer than the threshold. The access time point to be recorded may be a time point at which the health check processing is started. Storing of the survival information may be updating of information in the quorum apparatus or adding of information in the quorum apparatus. In the embodiment, storing of the survival information is updating of information (specifically, access time point) in the quorum apparatus.

Here, it is assumed that the failure 130 has occurred in the first quorum apparatus 50a with the active attribute. Here, the first and the second storage apparatuses 10a and 10b each changes the second quorum apparatus 50b with the standby attribute to have the active attribute. Even if a failure occurs in the inter storage communication path 7 in this state, the first storage apparatus 10a can determine whether the second storage apparatus 10b is surviving by checking the value of quorum update time point of second storage 417 in the quorum held table 400 held by the second quorum apparatus 50b changed to have the active attribute. The second storage apparatus 10b can determine whether the first storage apparatus 10a is surviving in a similar manner. Thus, when the failure occurs in one of the quorum apparatuses, the information system 1 can maintain the duplex configuration, unlike in the case where one quorum apparatus is provided and thus the duplex configuration is cancelled in preparation for the failure in the inter storage communication path 7.

Next, an example of operations performed in the information system 1 when a failure 131 occurs in the inter storage communication path 7 is described with reference to FIG. 7.

When the failure 131 occurs in the inter storage communication path 7, the synchronous remote copy cannot be performed between the first storage apparatus 10a and the second storage apparatus 10b. Thus, to prevent improper data from being provided to the host computer 3, the information system 1 sets only one of the storage apparatuses to be capable of executing the I/O request and set the other storage apparatus to be not capable of executing the I/O request. An example of specific operations is described below.

Figure 7:
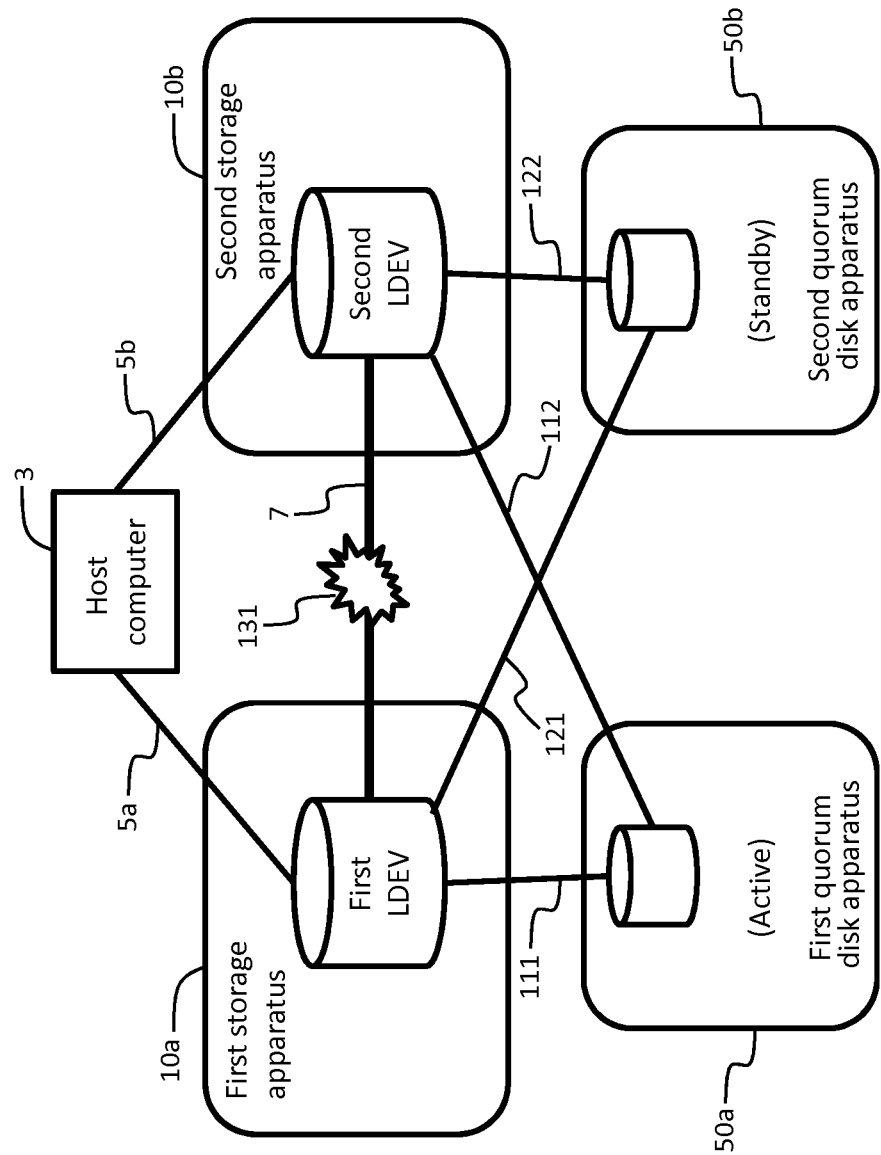
FIG. 7 shows an example of operations performed in the information system in a case where a failure has occurred in an inter storage communication path.

In a state shown in FIG. 7, when the host computer 3 transmits the I/O request to the first storage apparatus 10a, the first storage apparatus 10a determines whether the inter storage communication is executable upon receiving the I/O request. Here, the inter storage communication is non-executable due to the failure 131 that has occurred in the inter storage communication path 7, and thus the first storage apparatus 10a executes the following processing.

Specifically, the first storage apparatus 10a updates the value of quorum update time point of first storage 413 in the first quorum apparatus 50a and the second quorum apparatus 50b with the current access time point. Then, the first storage apparatus 10a refers to the value of quorum update time point of second storage 417 in the first quorum apparatus 50a with the active attribute to determine whether the second storage apparatus 10b has already accessed the first quorum apparatus 50a before the first storage apparatus 10a after a time point (referred to as "failure detected time point") at which the failure in the inter storage communication path 7 has been detected. For example, the first storage apparatus 10a determines that the second storage apparatus 10b has already accessed the first quorum apparatus 50a, when the value of quorum update time point of second storage 417 in the first quorum apparatus 50a indicates a time point later than the failure detected time point of inter storage communication path 7 and earlier than the current access time point of the first storage apparatus 10a.

When the second storage apparatus 10b has not accessed the first quorum apparatus 50a yet or when the value of I/O by second storage 415 is set to "non-executable", the first storage apparatus 10a sets the first storage apparatus 10a to be capable of executing the I/O request. More specifically, the first storage apparatus 10a sets (maintains) the value 403 of I/O by first storage 411 in the quorum held table 400 to "executable". Then, the first storage apparatus 10a processes the I/O request thus received and transmits a successful reply to the host computer 3.

In the health check processing executed at a predetermined interval, the second storage apparatus 10b updates the value of quorum update time point of second storage 417 in the first and the second quorum apparatuses 50a and 50b with a current access time point.

Then, the second storage apparatus 10b refers to the first quorum apparatus 50a with the active attribute to determine whether the first storage apparatus 10a has already accessed the first quorum apparatus 50a before the second storage apparatus 10b at a time point after the failure detected time point of the inter storage When the first storage apparatus 10a has already accessed the first quorum apparatus 50a, the second storage apparatus 10b sets the second storage apparatus 10b to be not capable of executing the I/O request. More specifically, the second storage apparatus 10b sets (changes) the value of I/O by second storage 415 in the quorum held table 400 to "non-executable".

When the second storage apparatus 10b has already accessed the first quorum apparatus 50a with the active attribute before the first storage apparatus 10a at or after the failure detected time point of the inter storage communication path 7, the second storage apparatus 10b is set to be capable of executing the I/O request and the first storage apparatus 10a is set to be not capable of executing the I/O request.

As described above, in the information system 1, only one of the storage apparatuses is set to be capable of executing the I/O request and the other one of the storage apparatuses is set to be not capable of executing the I/O request when the failure occurs in the inter storage communication path 7. Thus, the information system 1 can prevent the improper data from being provided to the host computer 3. When the failure occurs in the inter storage communication path 7, the first and the second storage apparatuses 10a and 10b may record the failure detected time point in at least one of the first and the second quorum apparatuses 50a and 50b for example.

Figure 8:
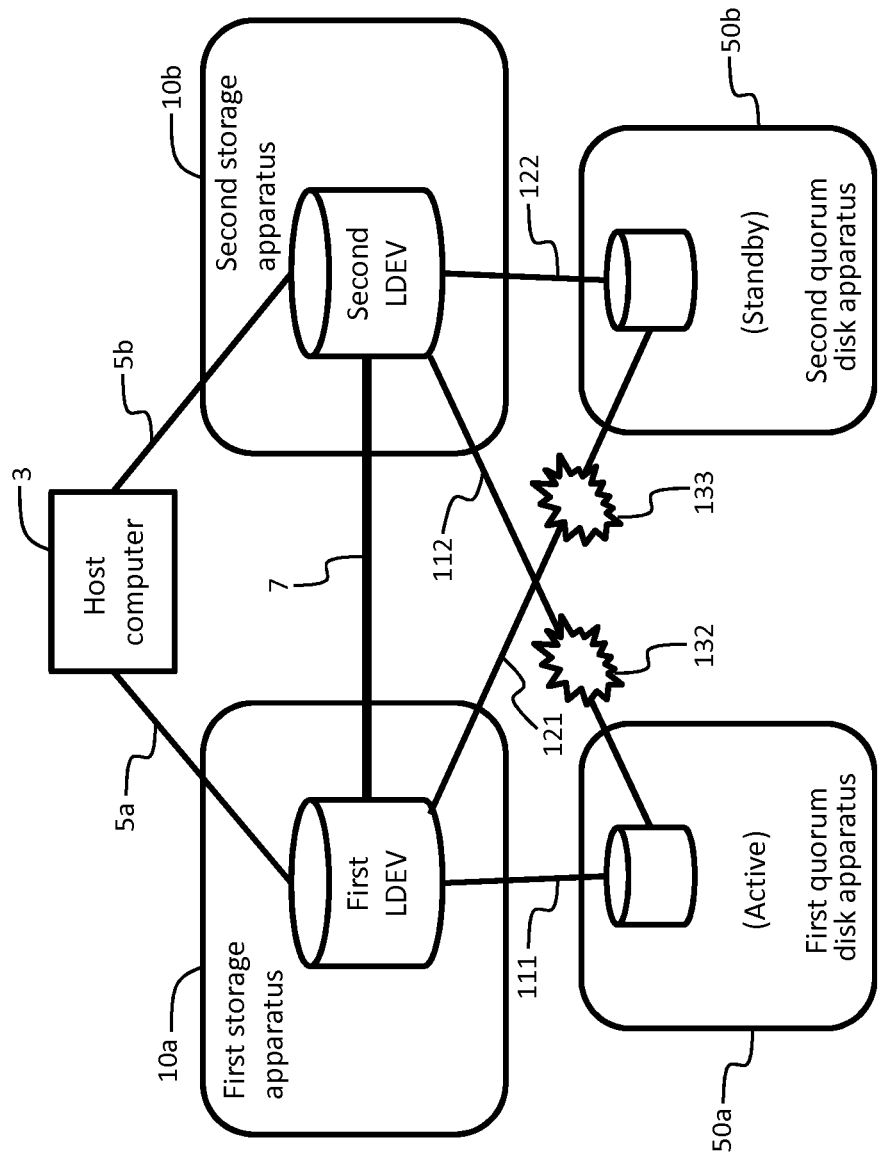
FIG. 8 shows an example of operations performed in the information system in a case where a failure has occurred in a communication path between a first storage apparatus and a second quorum apparatus and in a communication path between a second storage apparatus and a first quorum apparatus.

Next, an example of operations performed when a failure 133 has occurred in the communication path 121 between the first storage apparatus 10a and the second quorum apparatus 50b and a failure 132 has occurred in the communication path 112 between the second storage apparatus 10b and the first quorum apparatus 50a will be described with reference to FIG. 8.

Here, because there is no quorum apparatus that can be shared between the first and the second storage apparatuses 10a and 10b, each of the first and the second storage apparatuses 10a and 10b cannot check whether the counterpart storage apparatus is surviving by using the quorum apparatus. Thus, the information system 1 needs to set one of the storage apparatuses to be capable of executing the I/O request and the other one of the storage apparatuses to be not capable of executing the I/O request, in preparation for the failure in the inter storage communication path 7. Thus, the information system 1 sets the storage apparatus that can access the active quorum to be capable of executing the I/O request and sets the storage apparatus that cannot access the active quorum to be not capable of executing the I/O request. An example of specific operations is described below.

In the health check processing executed at a predetermined interval, the first storage apparatus 10a recognizes its feasibility to access the first quorum apparatus 50a with the active attribute and its lack of feasibility to access the second quorum apparatus 50b with the standby attribute. The first storage apparatus 10a can access the first quorum apparatus 50a with the active attribute and thus is set to be capable of executing the I/O request.

In the health check processing executed at a predetermined interval, the second storage apparatus 10b recognizes its feasibility to access the second quorum apparatus 50b with the standby attribute and its lack of feasibility to access the first quorum apparatus 50a with the active attribute. The second storage apparatus 10b cannot access the first quorum apparatus 50a with the active attribute and thus is set to be not capable of executing the I/O request.

As described above, when there is no quorum apparatus that can be shared between the first storage apparatus 10a and the second storage apparatus 10b, the information system 1 sets the storage apparatus that can access the quorum apparatus with the active attribute to be capable of executing the I/O request and sets the storage apparatus that cannot access the quorum apparatus with the active attribute to be not capable of executing the I/O request, in preparation for the failure in the inter storage communication path 7. Thus, the information system 1 can be prevented from providing the improper data to the host computer 3.

Figure 9:
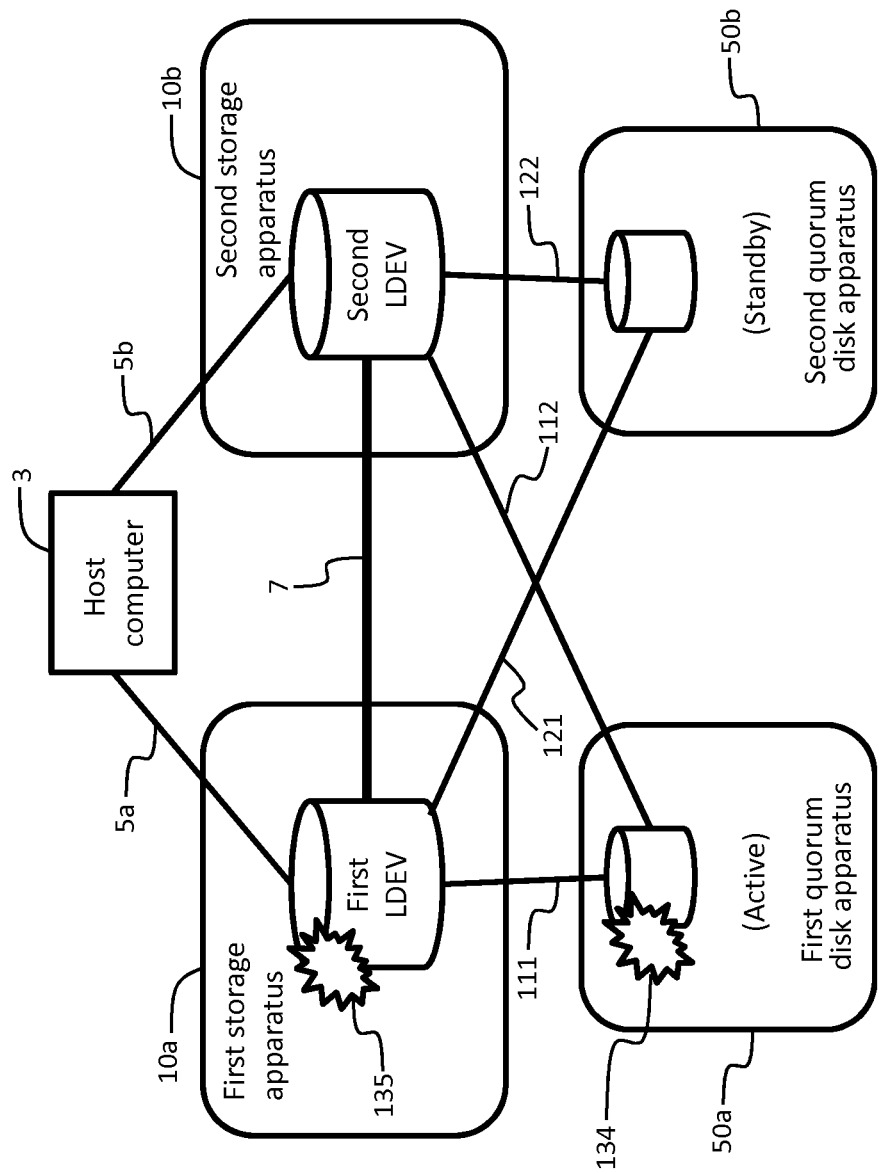
FIG. 9 shows an example of operations performed in the information system in a case where a failure has occurred in the first storage apparatus and in the first quorum apparatus with the active attribute.

Next, an example of operations performed in the information system 1 when a failure 135 has occurred in the first storage apparatus 10a and a failure 134 has occurred in the first quorum apparatus 50a with the active attribute will be described with reference to FIG. 9.

Here, the first storage apparatus 10a is not capable of executing the I/O request due to the failure 135. As described above, the second storage apparatus 10b cannot access the first quorum apparatus 50a with the active attribute and thus is set to be not capable of executing the I/O request. Thus, the system as a whole is not capable of executing the I/O request due to the following reason.

It is assumed that the first storage apparatus 10a writes data corresponding to a write request received from the host computer 3, and then the failure occurs in the first storage apparatus 10a before the data is synchronized with that in the second storage apparatus 10b. When the second storage apparatus 10b processes a read request for the write data from the host computer 3 in this state, the second storage apparatus 10b provides improper data not expected by the host computer 3.

The information system 1 sets the second storage apparatus 10b to be not capable of executing the I/O request as described above to prevent the improper data from being provided to the host computer 3.

Figure 10:
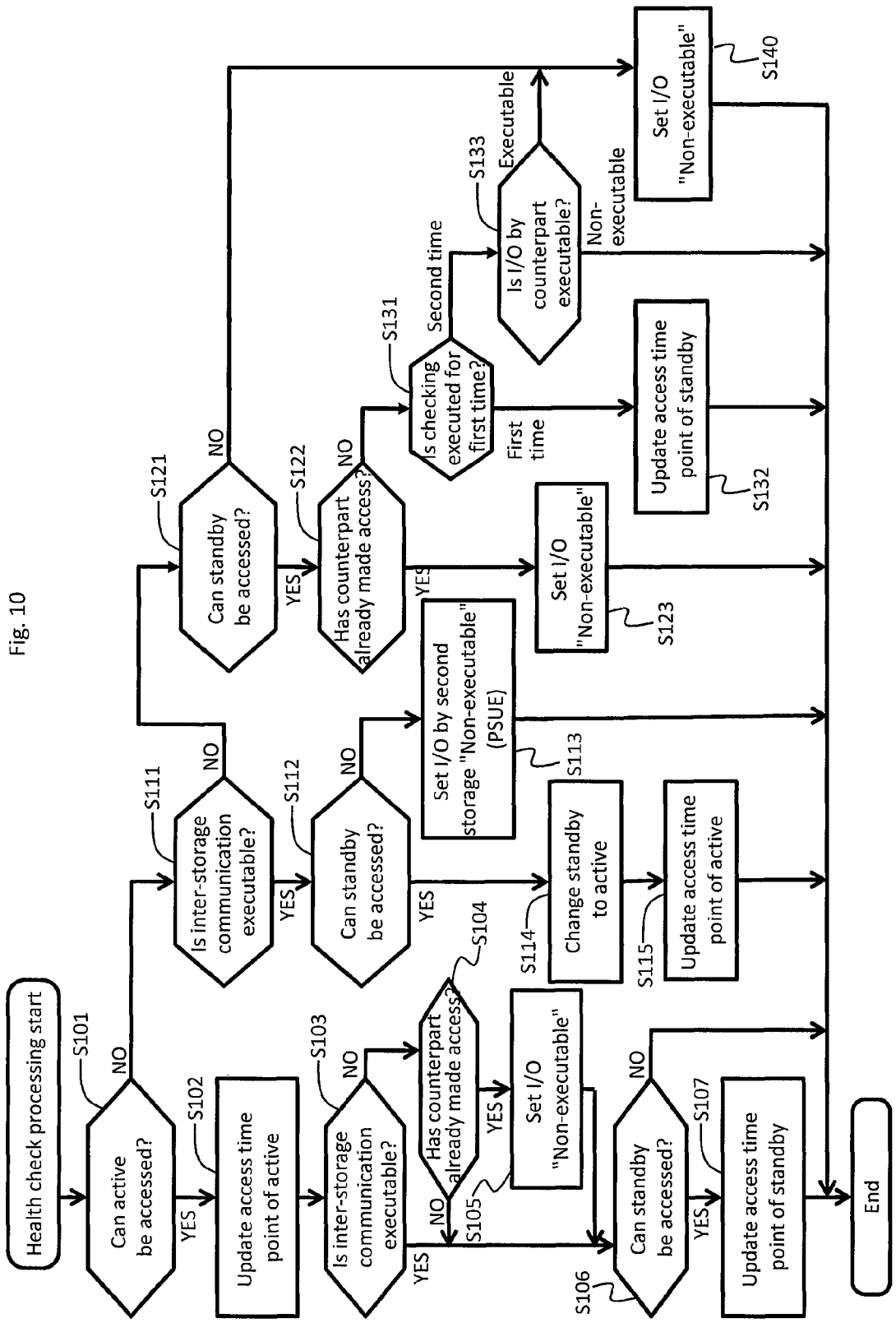
FIG. 10 shows an example of a flowchart of health check processing repeatedly executed in each storage apparatus.

The health check processing, executed by each of the first and the second storage apparatuses 10a and 10b, is described below with reference to a flowchart in FIG. 10. Each of the first and the second storage apparatuses 10a and 10b executes the following health check processing at a predetermined interval.

The storage apparatus determines whether the active quorum can be accessed (S101).

A case where the storage apparatus can access the active quorum (S101: YES) is described below. The storage apparatus updates the value of quorum update time point (313 or 317) in the active quorum with the access time point at which the storage apparatus has accessed the active quorum (S102). Then, the storage apparatus determines whether the inter storage communication is executable (S103).

When the inter storage communication is non-executable (S103: NO), the storage apparatus determines whether the counterpart storage apparatus has already accessed the active quorum at or after the failure detected time point of the inter storage communication path 7 (S104).

When the counterpart storage apparatus has already accessed the active quorum (S104: YES), the storage apparatus sets "non-executable" for the request by the storage apparatus (S105), and then proceeds to S106. When the counterpart storage apparatus has not accessed the active quorum yet (S104: NO), the storage apparatus proceeds to S106 without the processing described above at S105.

The storage apparatus determines whether the standby quorum can be accessed (S106). When the standby quorum can be accessed (S106: YES), the storage apparatus updates the value of quorum update time point (313 or 317) held by the standby quorum with the access time point at which the storage apparatus has accessed the standby quorum (S107) and terminates the processing (end). When the standby quorum cannot be accessed (S106: NO), the storage apparatus terminates the processing without the processing described above (end).

A case where the storage apparatus cannot access the active quorum (S101: NO) is described below. The storage apparatus determines whether the inter storage communication is executable (S111).

A case where the inter storage communication is executable is described below (S111: YES). The storage apparatus determines whether the standby quorum can be accessed (S112). When the standby quorum cannot be accessed (S112: NO), the storage apparatus sets the second storage apparatus 10b to be not capable of executing the I/O request (S113) and terminates the processing (end). Thus, when neither the active attribute nor the standby attribute can be accessed in a state where the inter storage communication is executable, only the first storage apparatus 10a, preferentially accessed by the host computer 3, is set to be capable of executing the I/O request, and the second storage apparatus 10b is set to be not capable of executing the I/O request.

When the standby quorum can be accessed (S112: YES), the storage apparatus changes the attribute of the standby quorum to the active attribute (S114). Then, the storage apparatus updates the value of quorum update time point (313 or 317) held by the quorum apparatus changed to have the active attribute (S115), and terminates the processing (end).

A case where the inter storage communication is non-executable (S111: NO) is described below. The storage apparatus determines whether the standby quorum can be accessed (S121).

When the standby quorum cannot be accessed (S121: NO), the storage apparatus sets the storage apparatus to be not capable of executing the I/O request (S140), and terminates the processing (end). Thus, the storage apparatus that cannot access both of the quorum apparatuses with the active attribute and the standby attribute and cannot execute the inter storage communication is set to be not capable of executing the I/O request.

When the standby quorum can be accessed (S121: YES), the storage apparatus determines whether the counterpart storage apparatus has already accessed the standby quorum (S122).

When the counterpart storage apparatus has already accessed the standby quorum (S122: YES), the storage apparatus sets the storage apparatus to be not capable of executing the I/O request (S123), and terminates the processing (end).

When the counterpart storage apparatus has not accessed the standby quorum yet (S122: NO), the storage apparatus refers to the value of standby flag (414 or 418) to determine whether the checking is executed for the first time (S131).

When the checking is executed for the first time (S131: first), the storage apparatus updates the value of quorum update time point (313 or 317) held by the standby quorum with the access time point of the storage apparatus (S132), and terminates the processing for the time being (end). Then, the storage apparatus execute the following "second" processing in the next health check processing.

When the checking is executed for the second time (S131: second), the storage apparatus refers to I/O for the standby quorum (411 or 415) to determine whether the counterpart storage apparatus is set to be not capable of executing the I/O request (S133).

When the counterpart storage apparatus is set to be not capable of executing the I/O request (S133: non-executable), the storage apparatus terminates the processing (end) while being capable of executing the I/O request. This is because the counterpart storage apparatus is surviving but is not capable of executing the I/O request due to a certain reason, and thus the storage apparatus has to be capable of executing the I/O request.

When the counterpart storage apparatus is still capable of executing the I/O request (S133: executable), the storage apparatus sets the storage apparatus to be not capable of executing the I/O request (S140), and terminates the processing (end). This is because whether the counterpart storage apparatus is surviving cannot be checked, and the storage apparatus needs to be not capable of executing the I/O request to prevent the improper data from being provided to the host computer 3.

Figure 11:
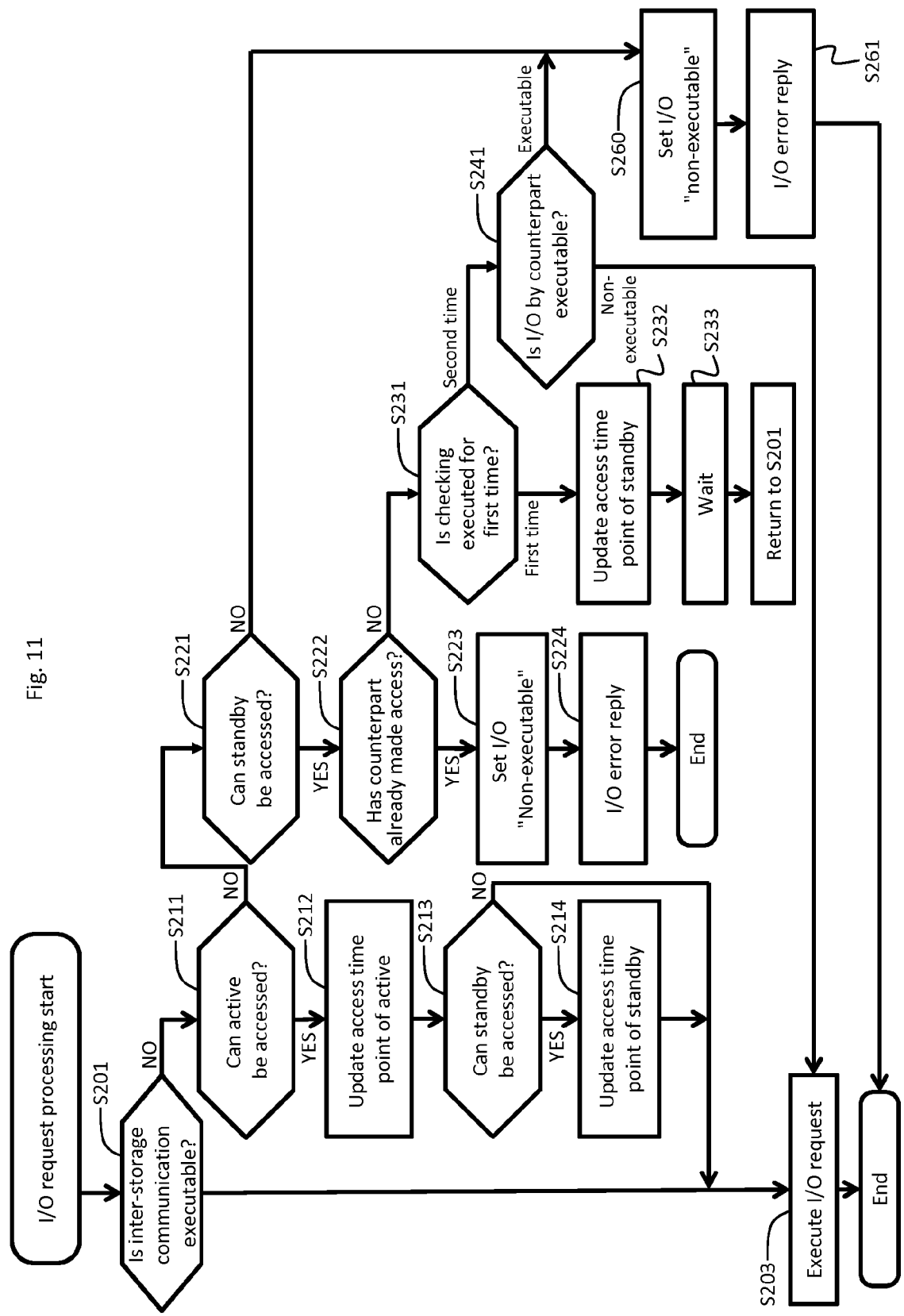
FIG. 11 shows an example of a flowchart of I/O request processing executed when an I/O request is received.

The I/O request processing is described below with reference to a flowchart in FIG. 11. The first storage apparatus 10a and the second storage apparatus 10b each execute the following I/O request upon receiving the I/O request from the host computer 3. The host computer 3 of the present embodiment first transmits the I/O request to the first storage apparatus 10a. When the I/O request ends in an error, the host computer 3 transmits the I/O request to the second storage apparatus 10b.

Upon receiving the I/O request from the host computer 3, the storage apparatus determines whether the inter storage communication is executable (S201).

When the inter storage communication is executable (S201: YES), the storage apparatus executes the I/O request (S203) and terminates the processing (end). When the I/O request from the host computer 3 is the write request, the storage apparatus executes the synchronous remote copy of the write data to the counterpart storage apparatus through the inter storage communication path 7 to maintain data matching between the storages.

Next, a case where the storage apparatus cannot execute the inter storage communication (S201: NO) will be described below. Here, the storage apparatus determines whether the active quorum can be accessed (S211).

A case where the storage apparatus can access the active quorum (S211: YES) is described below. Here, the storage apparatus updates the value of quorum update time point (313 or 317) held by the active quorum with the access time point of the storage apparatus (S212). Then, the storage apparatus determines whether the standby quorum can be accessed (S213). When the standby quorum can be accessed (S213: YES), the storage apparatus updates the value of quorum update time point (313 or 317) held by the standby quorum with the access time point of the storage apparatus (S214), and proceeds to S203. When the standby quorum cannot be accessed (S213: NO), the storage apparatus proceeds to S203 without the processing described above.

The storage apparatus executes the I/O request in S203 (S203) and terminates the processing (end). For example, when the first storage apparatus 10a can access the active quorum, the I/O request from the host computer 3 is executed by the first storage apparatus 10a, and thus is note received by the second storage apparatus 10b. All things considered, the information system 1 does not provide the improper data to the host computer 3 even when the inter storage communication is non-executable.

A case where the storage apparatus cannot access the active quorum (S211: NO) is described below. Here, the storage apparatus determines whether the standby quorum can be accessed (S221). When the standby quorum cannot be accessed (S221: NO), the storage apparatus sets the storage apparatus to be not capable of executing the I/O request (S260), transmits an I/O error reply to the host computer 3

(S261), and terminates the processing (end). All things considered, the storage apparatus that cannot access both the quorum apparatuses with the active attribute and the standby attribute and cannot execute the inter storage communication does not execute the I/O request. This is because when data is written to such a storage apparatus, data mismatch between the storage might occur. For example, when the first storage apparatus 10a transmits the IO error reply, the host computer 3 next transmits the I/O request to the second storage apparatus 10b.

When the standby quorum can be accessed (S221: YES), the storage apparatus checks whether the counterpart storage apparatus has already accessed the standby quorum at or after the failure detected time point of the inter storage communication path 7 (S222).

When the counterpart storage apparatus has already accessed the standby quorum (S222: YES), the storage apparatus sets the storage apparatus to be not capable of executing the I/O request (S223). Then, the storage apparatus transmits the I/O error reply to the host computer 3 (S224), and terminates the processing (end). This is because when the counterpart storage apparatus has already accessed the standby access quorum, it means that the counterpart storage apparatus is surviving.

When the counterpart storage apparatus has not accessed the standby quorum yet (S222: NO), the storage apparatus refers to the value of standby flag (414 or 418) to determine whether the checking is executed for the first time (S231).

When the checking is executed for the first time (S231: first), the storage apparatus updates the value of quorum update time point (313 or 317) held by the standby quorum with the access time point of the storage apparatus (S232). Then, the storage apparatus waits for a period longer than the predetermined interval of the health check processing (S233), and then returns to S201. Then, the storage apparatus executes the following processing in the second checking (S231: second).

The storage apparatus refers to feasibility of I/O (411 or 415) in the standby quorum, to determine whether the counterpart storage apparatus is not capable of executing the I/O request (S241).

When the counterpart storage apparatus is not capable of executing the I/O request (S241: non-executable), the storage apparatus executes the I/O request (S203) with the setting to be capable of executing the I/O request maintained, and terminates the processing (end). When the counterpart storage apparatus is set to be capable of executing the I/O request (S241: executable), the storage apparatus sets (changes) the storage apparatus to be not capable of executing the I/O request (S260). Then, the storage apparatus transmits the I/O error reply to the host computer 3 (S261) and terminates the processing (end). This is because whether the counterpart storage apparatus is surviving is yet to be checked at this point, and thus the storage apparatus is set to be not capable of executing the I/O request so that the improper data is prevented from being provided to the host computer 3.

How the feasibility of the storage apparatus to execute the I/O request changes in the health check processing is described below with reference to Table 500 in FIG. 12.

(1) The storage apparatus maintains the setting of being capable of executing the I/O request when the inter storage communication is executable and the active quorum and the standby quorum can be accessed (511).
(2) The storage apparatus maintains the setting of being capable of executing the I/O request when the inter storage communication is executable, the active quorum can be accessed, and the standby quorum cannot be accessed (512).
(3) The storage apparatus, maintains the setting of being capable of executing the I/O request and changes the attribute of the standby quorum to "active", when the inter storage communication is executable, the active quorum cannot be accessed, and when the standby quorum can be accessed (513).
(4) The storage apparatus sets the second storage apparatus to be not capable of executing the I/O request and maintains the setting of being capable of executing the I/O request when the inter storage communication is executable, and the active quorum and the standby quorum cannot be accessed (514).
(5) In a state where the inter storage communication is non-executable and the active quorum and the standby quorum can be accessed, the storage apparatus changes the setting of the storage apparatus to be not capable of executing the I/O request when the counterpart storage apparatus has already accessed the active quorum, and maintains the setting of being capable of executing the I/O request when the storage apparatus is the first one to access the active quorum (515).
(6) In a state where the inter storage communication is non-executable, the active quorum can be accessed, and the standby quorum cannot be accessed, the storage apparatus changes the setting of the storage apparatus to be not capable of executing the I/O request when the counterpart storage apparatus has already accessed the active quorum, and maintains the setting of being capable of executing the I/O request when the storage apparatus is the first one to access the active quorum (516).
(7) In a state where the inter storage communication is non-executable, the active quorum cannot be accessed, and the standby quorum can be accessed, the storage apparatus changes the setting of the storage apparatus to be not capable of executing the I/O request when the counterpart storage apparatus has already accessed the standby quorum and maintains the setting of the storage apparatus to be capable of executing the I/O request when the storage apparatus is the first one to access the standby quorum (517).
(8) The storage apparatus changes the setting of the storage apparatus to be not capable of executing the I/O request when the inter storage communication is non-executable, and the active quorum and the standby quorum cannot be accessed (518). As shown in FIG. 9, a failure in one of the storage apparatuses is equivalent to a failure in the inter storage communication for the other normally operating storage apparatus, and thus corresponds to the patterns (5) to (8). The same applies to FIG. 13 described next.

Figure 13:
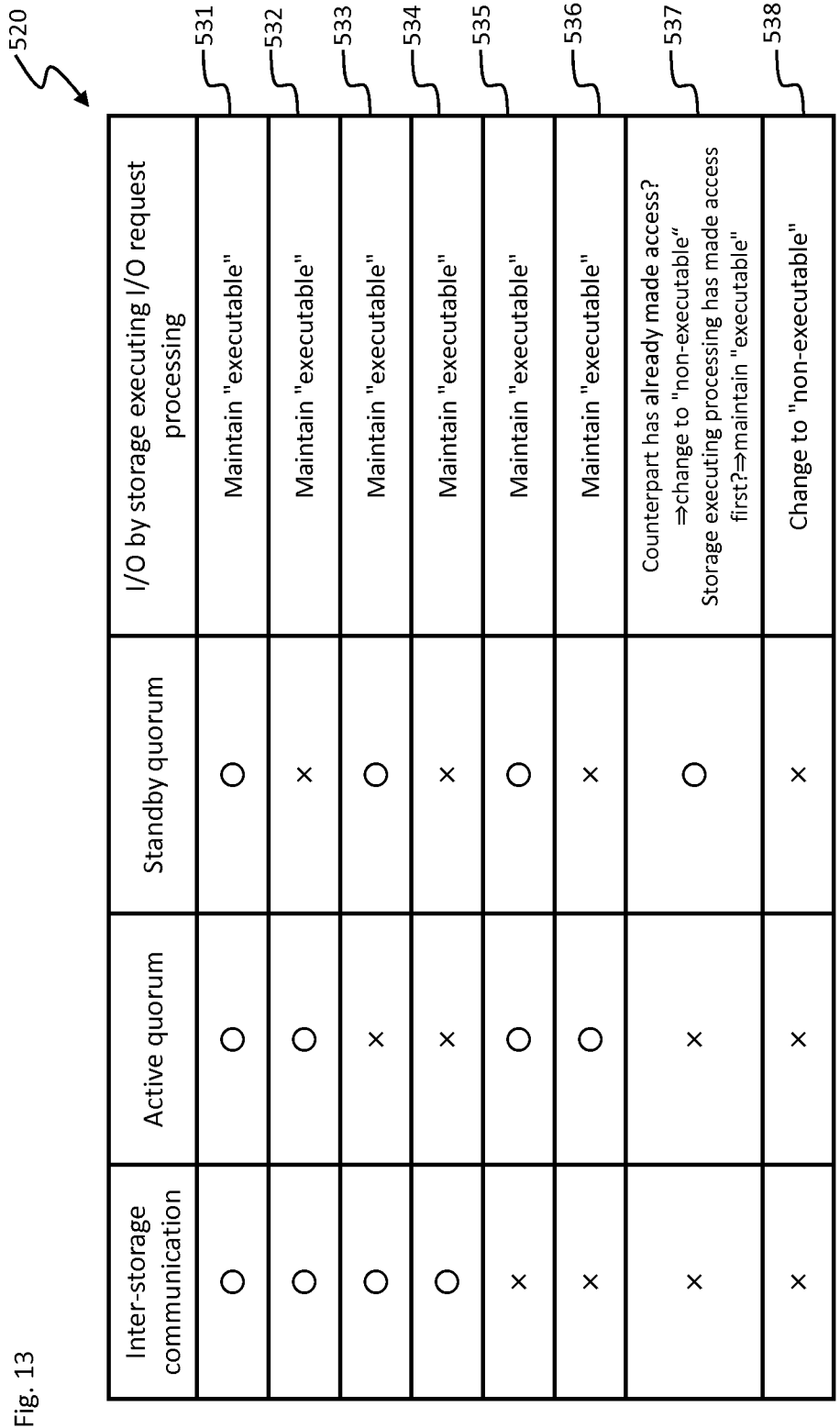
FIG. 13 shows examples of how the feasibility of the storage apparatus to execute the I/O request changes in the I/O request processing.

How the feasibility of the storage apparatus to execute the I/O request changes in the I/O request processing is described below with reference to Table 520 in FIG. 13.
(1) The storage apparatus maintains the setting of being capable of executing the I/O request when the inter storage communication is executable and the active quorum and the standby quorum can be accessed (531).
(2) The storage apparatus maintains the setting of being capable of executing the I/O request when the inter storage communication is executable, the active quorum can be accessed, and the standby quorum cannot be accessed (532).
(3) The storage apparatus maintains the setting of being capable of executing the I/O request when the inter storage communication is executable, the active quorum cannot be accessed, and the standby quorum can be accessed (533).

(4) The storage apparatus maintains the setting of being capable of executing the I/O request when the inter storage communication is executable and the active quorum and the standby quorum cannot be accessed (534).

(5) The storage apparatus maintains the setting of being capable of executing the I/O request when the inter storage communication is non-executable and the active quorum and the standby quorum can be accessed (535).

(6) The storage apparatus maintains the setting of being capable of executing the I/O request when the inter storage communication is non-executable, the active quorum can be accessed, and the standby quorum cannot be accessed (536).

(7) In a state where the inter storage communication is non-executable, the active quorum cannot be accessed, and the standby quorum can be accessed, the storage apparatus changes the setting of the storage apparatus to be not capable of executing the I/O request when the counterpart storage apparatus has already accessed the standby quorum and maintains the setting of the storage apparatus to be capable of executing the I/O request when the storage apparatus is the first one to access the standby quorum (537).

(8) The storage apparatus changes the setting of the storage apparatus to be not capable of executing the I/O request when the inter storage communication is non-executable, and the active quorum and the standby quorum cannot be accessed (538).

The health check processing and the I/O request, described above as being executed by the "storage apparatus", are technically executed by the storage controller.

The embodiment of the present invention described above is given in an intension to exemplarily describe the present invention, and not in an intension to limit the scope of the present invention to the embodiment. A person skilled in the art can implement the present invention in various modes without departing from the gist of the present invention.

For example, upon being set to be not capable of executing the I/O request, the first storage apparatus 10a and the second storage apparatus 10b may each notify the host computer 3 of the situation. The host computer 3 that has received the notification may no longer transmit the I/O request to the storage apparatus that has transmitted the notification.

For example, the first storage apparatus 10a and the second storage apparatus 10b may each notify a management computer (not shown) that manages the first storage apparatus 10a and the second storage apparatus 10b of a detection result (indicating that, for example, the inter storage communication is executable or non-executable, the first quorum apparatus 50a can be accessed or cannot be accessed, the second quorum apparatus 50b can be accessed or cannot be accessed, or the like). Based on the notification (detection result) from each of the first storage apparatus 10a and the second storage apparatus 10b, the management computer may request each of the first storage apparatus 10a and the second storage apparatus 10b to change the setting (capable or not capable of executing the I/O request). Thus, each of the first storage apparatus 10a and the second storage apparatus 10b may change the setting in response to the request from the management computer. The attribute of the quorum apparatus may also be changed in response to a request from the management computer.

REFERENCE SIGNS LIST

1 Information system
10a First storage apparatus
10b Second storage apparatus
50a First quorum apparatus
50b Second quorum apparatus
7 Inter storage communication path

The invention claimed is:

1. An information system comprising:
first and second storage apparatuses each coupled to a host computer that transmits an I/O request as a write request or a read request, and which are configured to copy, upon receiving the write request, data corresponding to the received write request to a counterpart storage apparatus;
a first quorum apparatus coupled to the first and the second storage apparatuses; and
a second quorum apparatus coupled to the first and the second storage apparatuses,
wherein the first and the second storage apparatuses are each configured to:
perform control to determine whether to execute the I/O request in accordance with an execution feasibility setting, and
set a first attribute as an attribute of one of the first and the second quorum apparatuses and set a second attribute as an attribute of the other one of the first and the second quorum apparatuses, and
wherein, in health check processing that is repeatedly executed, the first and the second storage apparatuses are each configured to:
store survival information indicating whether the storage apparatus is surviving in the first and the second quorum apparatuses,
check whether the survival information of the counterpart storage apparatus is able to be checked from any one of the first and the second quorum apparatuses, and, when the survival information of the counterpart storage apparatus is unable to be checked from the quorum apparatus with the first attribute, the survival information of the counterpart storage apparatus is checked from the quorum apparatus with the second attribute, and
set the execution feasibility setting of the storage apparatus based on whether the survival information of the storage apparatus is able to be stored in one or both of the first and the second quorum apparatuses, and whether the survival information of the counterpart storage apparatus is able to be checked from any one of the first and the second quorum apparatuses,
wherein, in the health check processing, the first and the second storage apparatuses are each configured to:
set the execution feasibility setting to indicate being capable of executing the I/O request when synchronous copying is executable, and both the storage apparatus and the counterpart storage apparatus are able to store the survival information in at least one of the first and the second quorum apparatuses.

2. The information system according to claim 1, wherein, in the health check processing, one of the first and the second storage apparatuses is configured to:
set the execution feasibility setting to indicate not being capable of executing the I/O request when the synchronous copying is executable, and the survival information is unable to be stored in the quorum apparatus with the first attribute, and when the survival information is unable to be stored in the quorum apparatus with the second attribute.

3. The information system according to claim 2, wherein, in the health check processing, the first and the second storage apparatuses are each configured to change the attribute of the quorum apparatus with the second attribute to the first attribute when the synchronous copying is executable, and the survival information is unable to be stored in the quorum apparatus with the first attribute, and when the survival information is able to be stored in the quorum apparatus with the second attribute.

4. The information system according to claim 3, wherein, in the health check processing, in a state where the synchronous copying is non-executable, and the survival information is unable to be stored in the quorum apparatus with the first attribute, and when the survival information is able to be stored in the quorum apparatus with the second attribute, the first and the second storage apparatuses are each configured to:
  set the execution feasibility setting to indicate not being capable of executing the I/O request, when the storage apparatus has stored the survival information in the quorum apparatus with the second attribute after the counterpart storage apparatus has stored the survival information after the synchronous copying is disabled, and
  wherein, in the state where the synchronous copying is non-executable, and the survival information is unable to be stored in the quorum apparatus with the first attribute, and when the survival information is able to be stored in the quorum apparatus with the second attribute, the first and the second storage apparatuses are each configured to:
  set the execution feasibility setting thereof to indicate being capable of executing the I/O request, when the storage apparatus has stored the survival information in the quorum apparatus with the second attribute before the counterpart storage apparatus has stored the survival information after the synchronous copying is disabled and the execution feasibility setting of the counterpart storage apparatus is the setting of not being capable of executing the I/O request.

5. The information system according to claim 1, wherein, in the health check processing, in a state where the synchronous copying is non-executable, and the survival information is unable to be stored in the quorum apparatus with the first attribute, and when the survival information is able to be stored in the quorum apparatus with the second attribute, the first and the second storage apparatuses are each configured to:
  set the execution feasibility setting to indicate not being capable of executing the I/O request when the storage apparatus has stored the survival information in the quorum apparatus with the second attribute after the counterpart storage apparatus has stored the survival information after the synchronous copying is disabled.

6. The information system according to claim 5, wherein, in the health check processing, in a state where the synchronous copying is non-executable, the survival information is unable to be stored in the quorum apparatus with the first attribute, and the survival information is able to be stored in the quorum apparatus with the second attribute, the first and the second storage apparatuses are each configured to:
  set the execution feasibility setting thereof to indicate being capable of executing the I/O request when the storage apparatus has stored the survival information in the quorum apparatus with the second attribute before the counterpart storage apparatus has stored the survival information after the synchronous copying is disabled and the execution feasibility setting of the counterpart storage apparatus is the setting of not being capable of executing the I/O request.

7. The information system according to claim 1, wherein, in processing for the I/O request received from the host computer, the first and the second storage apparatuses are each configured to:
  set the execution feasibility setting thereof to indicate not being capable of executing the I/O request and transmit an error reply for the received I/O request to the host computer, when the synchronous copying is non-executable, and the survival information is unable to be stored in the quorum apparatus with the first attribute, and when the survival information is unable to be stored in the quorum apparatus with the second attribute.

8. The information system according to claim 7, wherein, in the processing for the I/O request received from the host computer, in a state where the synchronous copying is non-executable, and the survival information is unable to be stored in the quorum apparatus with the first attribute, and when the survival information is able to be stored in the quorum apparatus with the second attribute, the first and the second storage apparatuses are each configured to:
  set the execution feasibility setting thereof to indicate not being capable of executing the I/O request and transmit the error reply for the received I/O request to the host computer, when the storage apparatus has stored the survival information in the quorum apparatus with the second attribute after the counterpart storage apparatus has stored the survival information after the synchronous copying is disabled.

9. The information system according to claim 1, wherein, in processing for the I/O request received from the host computer, the first and the second storage apparatuses are each configured to:
  set the execution feasibility setting thereof to indicate not being capable of executing the I/O request and transmit an error reply for the received I/O request to the host computer, when the synchronous copying is non-executable, and the survival information is unable to be stored in the quorum apparatus with the first attribute, and when the survival information is unable to be stored in the quorum apparatus with the second attribute, and transmit the error reply for the received I/O request to the host computer, and
  wherein, in the state where the synchronous copying is non-executable, and the survival information is unable to be stored in the quorum apparatus with the first attribute, and when the survival information is able to be stored in the quorum apparatus with the second attribute, the first and the second storage apparatuses are each configured to:
  set the execution feasibility setting to indicate not being capable of executing the I/O request and transmit the error reply for the received I/O request to the host computer, when the storage apparatus has stored the survival information in the quorum apparatus with the second attribute after the counterpart storage apparatus has stored the survival information after the synchronous copying is disabled.

10. An I/O processing method executed in a system including first and second storage apparatuses each coupled to a host computer configured to transmit an I/O request as a write request or a read request, and configured to perform synchronous copying, upon receiving the write request, of data corresponding to the received write request to a counterpart storage apparatus, and to perform control to determine whether to execute the I/O request in accordance with an execution feasibility setting as a setting to determine whether to execute the I/O request, the I/O processing method comprising:

setting a first attribute as an attribute of one of first and second quorum apparatuses and setting a second attribute as an attribute of the other one of the first and the second quorum apparatuses, and repeatedly executing health check processing by each of the first and the second storage apparatuses, including:

storing survival information indicating whether the storage apparatus is survival in first and second quorum apparatuses coupled to each of the first and the second storage apparatuses;

checking whether the survival information of the counterpart storage apparatus is able to be checked from any one of the first and the second quorum apparatuses, and when the survival information of the counterpart storage apparatus is unable to be checked from the quorum apparatus with the first attribute, the survival information of the counterpart storage apparatus is checked from the quorum apparatus with the second attribute; and setting the execution feasibility setting of the storage apparatus based on whether the survival information of the storage apparatus is able to be stored in one or both of the first and the second quorum apparatuses, and whether the survival information of the counterpart storage apparatus is able to be checked from any one of the first and the second quorum apparatuses.

11. An information system comprising:

first and second storage apparatuses each coupled to a host computer that transmits an I/O request as a write request or a read request, and which are configured to copy, upon receiving the write request, data corresponding to the received write request to a counterpart storage apparatus;

a first quorum apparatus coupled to the first and the second storage apparatuses; and a second quorum apparatus coupled to the first and the second storage apparatuses, wherein the first and the second storage apparatuses are each configured to:

perform control to determine whether to execute the I/O request in accordance with an execution feasibility setting, and set a first attribute as an attribute of one of the first and the second quorum apparatuses and set a second attribute as an attribute of the other one of the first and the second quorum apparatuses, and wherein, in health check processing that is repeatedly executed, the first and the second storage apparatuses are each configured to:

store survival information indicating whether the storage apparatus is surviving in the first and the second quorum apparatuses, check whether the survival information of the counterpart storage apparatus is able to be checked from any one of the first and the second quorum apparatuses, and, when the survival information of the counterpart storage apparatus is unable to be checked from the quorum apparatus with the first attribute, the survival information of the counterpart storage apparatus is checked from the quorum apparatus with the second attribute, and set the execution feasibility setting of the storage apparatus to be based on whether the survival information of the storage apparatus is able to be stored in one or both of the first and the second quorum apparatuses, whether the survival information of the counterpart storage apparatus is able to be checked from any one of the first and the second quorum apparatuses, and whether synchronous copying is executable between the first and the second storage apparatuses, wherein, in the health check processing, the first and the second storage apparatuses are each configured to:

set the execution feasibility setting to indicate being capable of executing the I/O request when synchronous copying is executable, and both the storage apparatus and the counterpart storage apparatus are able to store the survival information in at least one of the first and the second quorum apparatuses, when the synchronous copying is non-executable, and the survival information is unable to be stored in the quorum apparatus with the first attribute, and when the survival information is able to be stored in the quorum apparatus with the second attribute, set the execution feasibility setting to indicate not being capable of executing the I/O request when the storage apparatus has stored the survival information in the quorum apparatus with the second attribute after the counterpart storage apparatus has stored the survival information after the synchronous copying is disabled, and when the synchronous copying is non-executable, the survival information is unable to be stored in the quorum apparatus with the first attribute, and the survival information is able to be stored in the quorum apparatus with the second attribute, set the execution feasibility setting thereof to indicate being capable of executing the I/O request when the storage apparatus has stored the survival information in the quorum apparatus with the second attribute before the counterpart storage apparatus has stored the survival information after the synchronous copying is disabled and the execution feasibility setting of the counterpart storage apparatus is the setting of not being capable of executing the I/O request.

\* \* \* \* \*